MORRIS & FRANKLIN.
Safety Railroad-Truck.
No. 98,613.
Patented Jan. 4, 1870.
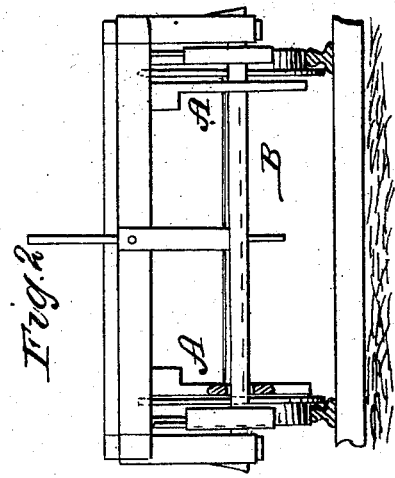
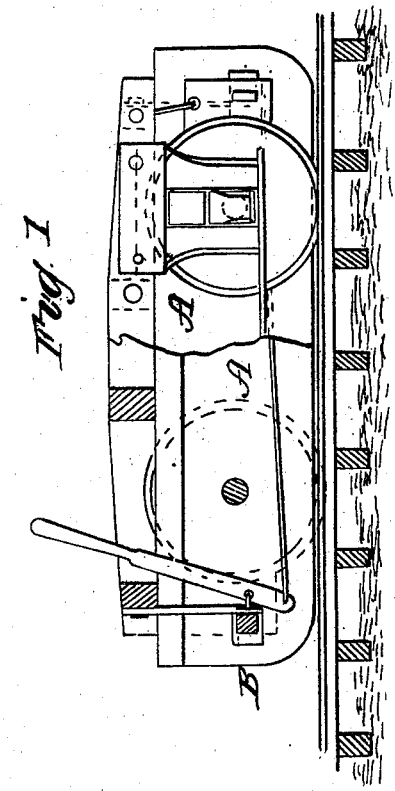

UNITED STATES PATENT OFFICE.

C. R. MORRIS AND H. W. FRANKLIN, OF BRIDGEPORT, CONNECTICUT.

IMPROVED SAFETY RAILWAY-TRUCK.

Specification forming part of Letters Patent No. 98,613, dated January 4, 1870.

*To all whom it may concern:*

Be it known that we, C. R. MORRIS and H. W. FRANKLIN, of Bridgeport, in the county of Fairfield and State of Connecticut, have invented a new and Improved Safety Railroad-Truck; and we do hereby declare that the following is a full, clear, and exact description thereof, which will enable others skilled in the art to make and use the same, reference being had to the accompanying drawings, forming part of this specification.

This invention relates to improvements in trucks for railroad-cars; and it consists in an improved form of guards for supporting the trucks if the wheels be thrown off the track, and preventing said wheels from going down between the ties; and it also consists of the combination, with the guards, of a brake mechanism arranged as hereinafter specified.

Figure 1 represents a side view, partly in elevation and partly sectioned, of a truck provided with our improvement; and Fig. 2 represents an end view of the same.

Similar letters of reference indicate corresponding parts.

A represents a pair of runner-guards, which may be made of stout planks or other substances, as found best. They are attached to the framing of the car-trucks, under the same, and at the inner sides of the wheels, running from end to end of the trucks, and projecting from the frame downward about as low as the wheels, so that when the trucks are thrown from the track they will be supported on the ties in a way to allow them to slide along smoothly until the train stops, thereby preventing the disastrous breaking up of the cars by the driving of the wheels over the ties.

These runners project sufficiently in advance of the wheels at each end for the brake-beams B to pass through holes in the ends, so that they will be prevented from falling in advance of the wheels in case of the breaking of the suspending-links, which often occurs when the cars run off, and frequently at other times.

When these runner-guards are made of planks they should be shod with iron or steel.

Having thus described our invention, what we claim as new, and desire to secure by Letters Patent, is—

1. The solid wooden runner-guards A, when extended beyond the truck-frame and rounded or curved at the lower corners, as shown and described, and for the purpose specified.

2. The combination, with the runner-guards, when attached to the trucks as described, of the brake-beams B, when arranged relatively to the said runners, substantially as specified.

C. R. MORRIS.
H. W. FRANKLIN.

Witnesses:
C. W. STRONG,
H. D. AVERILL.